(12) United States Patent
Vogt et al.

(10) Patent No.: US 6,730,360 B2
(45) Date of Patent: May 4, 2004

(54) LUBRICANT VARNISH COATING COMPONENT, LUBRICANT VARNISH AND METHODS FOR COATING ELASTOMERS SUCH AS WINDSHIELD WIPER BLADES

(75) Inventors: Andreas Vogt, Renningen (DE); Lutz Mueller, Aichtal (DE); Ulrich Hasenkox, Ditzingen (DE); Guido Klamt, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/297,359

(22) PCT Filed: Mar. 28, 2002

(86) PCT No.: PCT/DE02/01137
§ 371 (c)(1),
(2), (4) Date: Apr. 16, 2003

(87) PCT Pub. No.: WO02/081582
PCT Pub. Date: Oct. 17, 2002

(65) Prior Publication Data
US 2003/0157257 A1 Aug. 21, 2003

(30) Foreign Application Priority Data
Apr. 5, 2001 (DE) .......................................... 101 16 929

(51) Int. Cl.⁷ ............................... B05D 1/36; B05D 1/38
(52) U.S. Cl. .................... 427/368; 427/379; 427/412.1; 427/421; 528/44
(58) Field of Search ................................. 427/368, 379, 427/412.1, 421; 528/44

(56) References Cited

U.S. PATENT DOCUMENTS

| | | | |
|---|---|---|---|
| 4,483,893 A | 11/1984 | Harrold | |
| 5,306,537 A | 4/1994 | Citarel et al. | |
| 5,674,567 A | 10/1997 | Melby et al. | |
| 6,077,592 A | * | 6/2000 | Azuma et al. .............. 428/192 |

FOREIGN PATENT DOCUMENTS

| | | | |
|---|---|---|---|
| DE | 38 39 937 | | 5/1990 |
| DE | 38 38 904 | | 6/1990 |
| DE | 195 35 452 | | 3/1997 |
| EP | 0 281 216 | | 9/1988 |
| EP | 0 293 084 | | 11/1988 |
| EP | 0 430 421 | | 6/1991 |
| EP | 1234862 | * | 8/2002 |
| JP | 55 015 873 | | 2/1980 |
| JP | 10-166868 | * | 6/1998 |
| WO | WO 98/29484 | * | 7/1998 |

* cited by examiner

Primary Examiner—Erma Cameron
(74) Attorney, Agent, or Firm—Kenyon & Kenyon

(57) ABSTRACT

A lubricant varnish component and a lubricant varnish, for example, for coating elastomer profiles, are provided, wherein lubricant varnish component includes a polyurethane, a siloxane as well as a polyamide powder, a polyethylene powder or a solution of a polyamide. The lubricant varnish may additionally contain a curing agent, in particular an isocyanate-based curing agent. In addition, a first method for coating elastomers is proposed, wherein the proposed lubricant varnish is first applied in the form of a coating to an elastomer profile, and this coating then being dried and/or thermally crosslinked. Also, the proposed lubricant varnish, having or not having polyamide or polyethylene, may first be applied in the form of a first coat to the elastomer profile, and an alcoholic or aqueous solution of a polyamide in the form of a second coat or a polyamide powder or a polyethylene powder may then being applied to the first coat. The proposed lubricant varnish is suitable, for example, for the production of coated windshield wiper blades having a reduced coefficient of dry friction.

19 Claims, No Drawings

LUBRICANT VARNISH COATING COMPONENT, LUBRICANT VARNISH AND METHODS FOR COATING ELASTOMERS SUCH AS WINDSHIELD WIPER BLADES

This application is the national phase of International Application No. PCT/DE02/01137, filed Mar. 28, 2002.

FIELD OF THE INVENTION

The present invention relates to a lubricant varnish coating component, a lubricant varnish prepared therewith and methods for coating elastomers, for example, elastomer profiles, such as windshield wiper blades, using this lubricant varnish.

BACKGROUND INFORMATION

Windshield wiper blades are generally able to adapt to the contour of the windshield of the motor vehicle and remain flexible even at different temperatures. Wiper blades are, generally, therefore produced from elastomer profiles and rubber materials, such as natural rubber or chloroprene rubber. In addition, wiper blades may be made of silicone rubber or polyurethane rubber.

Compared to materials such as glass or plastic, elastomers have high coefficients of sliding friction so that, in the case of a specified vertical contact force of an elastomer profile in the form of a windshield wiper blade on the surface of a glass windshield, a multiple of the contact force may have to be applied for a horizontal movement. If the windshield wiper is operated under wet conditions, a thin lubricating film between the windshield wiper blade and the windshield is formed by the water film on the windshield so that hydrodynamic lubrication is established. However, problems may occur when the windshield wiper blade is operated without water as a lubricating film, for example, during summer or after short rain showers. Under such conditions, the windshield dries quickly, with the result that the coefficient of friction increases sharply, which may lead to squeaking, chattering or even stoppage of the windshield wiper.

Chlorination or bromination of the surface of the windshield wiper blade, i.e. curing, may be carried out in order to reduce the coefficient of friction of windshield wiper blades on a dry glass windshield. However, this may require exact process control and may be problematic in terms of environmental protection.

Conventionally, elastomer profiles may be provided with a coating which, for example, reduces the coefficient of friction under dry conditions, i.e. the coefficient of dry friction, $\mu_{dry}$. In Japanese Patent No. 55 015 873, a wiper lip is coated with a silicone rubber into which molybdenum disulfide has been introduced as a dry lubricant for reducing the coefficient of friction. A similar approach is adopted by German Patent No. 38 38 904, in which a polyurethane lacquer is used as a binder, into which graphite powder has been incorporated.

In addition, German Patent No. 38 39 937 describes a one-component polyurethane lacquer which contains reactive polysiloxanes for coating elastomers. European Patent No. 293 084 describes a coating which also contains an additive, such as carbon black, Teflon, graphite or talc, in addition to a polyurethane and a siloxane. Coatings which have a low coefficient of friction under dry conditions may be produced with this material on elastomers.

SUMMARY OF THE INVENTION

The lubricant varnish and component according to the present invention, and the method for coating elastomers in accordance with the present invention, provide a coating which has a particularly low coefficient of dry friction, for example, on windshield wiper blades, so that such wiper blades may be used on dry or drying vehicle windshields.

For example, the force necessary for moving the wiper arm over the windshield may be substantially reduced by the coating according to the present invention, so that the electric motor driving the wiper arm may be designed to be smaller. This also may permit the use of more economical motors and reduce the energy consumption in the motor vehicle. Vehicle types in which large, flat windshields are present may require very long wiper arms and wiper blades, for reducing the air resistance.

A reduction of unpleasant noises, such as squeaking or chattering, may be achieved by the coating on windshield wiper blades according to the present invention.

The lubricant varnish and methods according to the present invention provide for a coating on a windshield wiper blade that may ensure constant good wiping quality over a relatively long period, for example, corresponding to the time between the normal inspection intervals of a motor vehicle. The lubricant varnish according to the present invention has very good adhesion to and abrasion resistance on elastomer profiles.

Compared to the conventional halogenation of elastomer profiles, the methods according to the present invention provide that the applied lubricant varnish may be applied reliably with constant quality and simple process engineering. Moreover, the lubricant varnish according to the present invention may be more environmentally friendly.

If the lubricant varnish according to the present invention is present in the form of an aqueous 1-component or 2-component varnish, it may constitute no danger to the environment, the process costs are reduced, and storage is simplified.

The lubricant varnish according to the present invention may be applied in a variety of ways, for example by spraying, dipping or brushing.

In addition, the application of the coating to the elastomers may be effected before their vulcanization, so that the energy supplied during the vulcanization may simultaneously be used for final curing and/or thermal crosslinking, and the final curing of the lubricant varnish may take place in a very short time. Moreover, owing to the higher reactivity of the unvulcanized material, better crosslinking of the coating with the elastomer forming the substrate may be achieved.

The coating may also be applied after the vulcanization. This makes it possible to apply the coating outside the production line for the elastomer profiles.

An isocyanate-based curing agent may be added as a curing agent to the lubricant varnish component.

DETAILED DESCRIPTION

The present invention relates to a varnish sold by Henkel KGBA, Düsseldorf, under the trade name Sipiol® and intended for coating elastomers. This Sipiol® varnish, which has a polyurethane system which contains reactive polysiloxanes, is especially suitable for coating rubber profiles. The polysiloxanes crosslink with the polyurethane system so that they form a component which reduces the coefficient of friction and is integrated in the polymer. Depending on the choice of the specific Sipiol® coating, it is initially present in the form of an aqueous 1-component varnish or 2-component varnish and additionally contains carbon black as an additive.

Customary elastomer profiles for windshield wiper rubbers were initially coated with a Sipiol®-based lubricant varnish in a comparative experiment. For this purpose, the coating component Sipiol® WL 2000-21 sold by Henkel KGaA, which is present in the form of a carbon black-containing suspension, was mixed in the ratio 100:6 with the isocyanate-based curing agent WV20, likewise sold by Henkel KGaA, in accordance with instructions. This lubricant varnish was then applied in the form of a coat to the elastomer profiles which had been pretreated beforehand, to improve the adhesion, with a primer likewise sold by Henkel KGaA under the name Cuvertin® X8536.

After the application of this lubricant varnish to the elastomer profile, this was then dried for 90 minutes at 90° C. and cut, and the coefficient of dry friction against glass was then determined. This measurement gave still relatively high, unsatisfactory coefficients of dry friction $\mu_{dry}$ of from 1.5 to 2.5. Furthermore, the wiper rubber was greatly stretched in the longitudinal direction to check the adhesive strength of the coating produced. The coating adhered very well to the elastomer profile, i.e., no detachment was found.

A second comparative experiment was based on the coating system Sipiol® WL 1000-21, which is sold by Henkel KGaA and is present in the form of a carbon black-containing suspension, with which, however, in contrast to the Sipiol® WL 2000-21 system, no curing agent need be mixed prior to coating, i.e. it is a 1-component system. Otherwise the procedure was as before. Results obtained with the curing agent-free system Sipiol® WL 1000-21 were analogous to those obtained with the The comparative experiments show that conventional lubricant varnishes may not have sufficiently low coefficients of dry friction though they may be suitable for producing a firmly adhering coating on elastomer profiles. One of these lubricant varnishes is therefore used below as a matrix system to which further additives or dry lubricants are added, which results in a substantial reduction in the coefficient of dry friction.

Polyamide powder, polyethylene powder or a solution of polyamide is suitable as an additive. Lubricant varnishes modified in this manner may lead to very firmly adhering coatings on elastomer profiles, which are abrasion and weathering resistant, and have low coefficients of dry friction, $\mu_{dry}$, for example, less than 1.5 and in some cases less than 1.0. In addition, they exhibit no transfer to the opposite body, i.e. the wiped glass. This is important, for example, in the case of windshields, for ensuring that no undesired greasy film which might impair the vision is left behind.

In a first exemplary embodiment of the invention, starting from the Sipiol® WL 2000-21 system mentioned, to which the isocyanate-based curing agent WV20 was added as a curing agent, or starting from the curing agent-free system Sipiol® WL 1000-21, 1 g of a polyamide powder having as small a particle size as possible, for example less than 10 μm or less than 5 μm, was added per 10 ml of curing agent-free or curing agent-containing coating system. The suspension obtained was then thoroughly stirred and was then applied in the form of a coating to a still unvulcanized, extruded elastomer profile, which had been shaped into a windshield wiper blade. The elastomer profile was also pretreated beforehand with the primer Cuvertin® X8536, which is a solution of chlorinated polymers in organic solvents, for improving the adhesion. The application of the coating on the elastomer profile was effected by dipping in the example described.

The Sipiol® systems mentioned are aqueous polyurethane-polysiloxane dispersions which also contain further additives. Further details on these products from Henkel KGaA may be obtained from the corresponding data sheets.

After application of the described lubricant varnish containing a polyurethane, a siloxane, optionally the curing agent and the polyamide powder, introduced as an additive in the form of a thin coating to the elastomer profile, drying was initially carried out for 10 minutes at 120° C. Thereafter, the coated elastomer profile was cut and the coefficient of dry friction, $\mu_{dry}$, against glass was measured as in the above experiment. Coefficients of dry friction were measured which were substantially reduced compared to the above experiments, $\mu_{dry}$ lying between 0.9 and 1.5.

By using particularly fine polyamide powders having particle sizes of, for example, less than 10 μm, it is possible that no adverse effects on the wiping pattern in the case of a wet windshield occur with the use of the coated elastomer profiles as windshield wiper blades.

The solids proportion of the added polyamide powder in the lubricant varnish may be up to 90 percent by weight, based on the prepared lubricant varnish suspension. It may be, for example, less than 25 percent by weight, since in some cases the coating obtained may not remain sufficiently resilient at higher proportions, i.e. reduced adhesion of the coating on the elastomer profile may occur.

A polyethylene powder is also suitable as a pulverulent additive for the lubricant varnish component or the lubricant varnish. Polyethylene powders having an ultrahigh molecular weight may be used; the particle size of the powder particles may be less than 10 μm.

In a second exemplary embodiment, 1.5 g of polyethylene powder having an ultrahigh molecular weight were added to 10 ml of the mixture of one of the Sipiol® coating systems, i.e. Sipiol® WL 2000-21 containing the curing agent WV20 described or Sipiol® WL 1000-21 without curing agent, according to the first exemplary embodiment. For example, a polyethylene powder sold under the name PE-UHMW Hostalen® GUR 2126 by Ticona, Oberhausen, is suitable for this purpose.

The lubricant varnish obtained after addition of this polyethylene powder was once again applied, as already described above, to an elastomer profile and was dried for 15 minutes at 120° C. After subsequent cutting, the coefficient of dry friction against glass was determined analogously to the above exemplary embodiment, coefficients of dry friction of about 0.4 to 0.5 being measured. To this extent, polyethylene powder is a suitable dry lubricant or additive for a lubricant varnish for obtaining coats on windshield wipers having very low coefficients of dry friction.

A third exemplary embodiment may start from one of the Sipiol® coating systems already described and according to the first or second exemplary embodiment. Furthermore, an alcoholic or aqueous solution of a polyamide may be added to this coating, the polyamide contained therein acting as an additive which reduces the dry friction relative to glass and, as a result of the addition in dissolved form, may have a very fine distribution in the base system or matrix system having polyurethane and siloxane. Therefore, sufficient polyamide may be available as a dry lubricant everywhere in the coating.

Soluble polyamides which may be used are, for example, all polyamides or copolyamides soluble in alcohol. An N-methoxymethylated polyamide may be used. A compound catalyzing the crosslinking of the dissolved additive polyamide may be added to the lubricant varnish. For example, an organic acid is suitable for this purpose. In this way, two interpenetrating, insoluble networks may form with the crosslinked polyamide and the crosslinked polyurethane system, it also being possible for crosslinking of the polyamide with the polyurethane system to occur. The mixture of Sipiol® coating system and curing agent or curing agent-free Sipiol® coating system may ensure the elastic properties of the coating obtained, while the polyamide component reduces the coefficient of dry friction.

It is also possible initially to coat the elastomer profile with the unmodified Sipiol® coating system/curing agent mixture or the curing agent-free Sipiol® coating system, i.e. without the polyamide additive, and then to apply a further, second coat containing the polyamide dissolved in alcohol to this first coat before subsequent final curing. The application of the second coat may be effected both on the already air-dried first coat or wet-in-wet, i.e. on the still wet first coat. This procedure of having two coats applied in succession may allow the first coat to impart improved adhesion on the elastomer profile, while the second coat primarily reduces the dry friction of the elastomer profile or of the windshield wiper blade relative to glass.

Altogether, reduced abrasion and an increased service life of the windshield wiper blade produced may be achieved in this manner. Moreover, an adaptation of the additive or generally of the wiping behavior of the elastomer profile to the windshield type to be wiped may be effected by the application of the second coat on the elastomer profile provided with the first coat.

In a fourth exemplary embodiment, the Sipiol® curing agent mixture already described, or the curing agent-free Sipiol® system, may once again be prepared by stirring according to instructions and first diluted with 30% of water in order to reduce the thickness of the subsequently obtained coat compared to the exemplary embodiments having a pulverulent additive.

This lubricant varnish was then applied to a prepared elastomer profile and dried at 25° C. in air until no moist parts were visible. A 5% to 10% solution of a polyamide in an ethanol-water mixture, for example, a solution of the polyamide Ultramid® 1C, which is sold by BASF AG, Ludwigshafen, was then applied in the form of a second coat to this first coat. Thereafter, the elastomer profile coated in this manner was dried, at from 90° C. to 120° C. for 15 minutes, and cut, and the coefficient of dry friction on glass was then determined as above. Values of from 0.8 to 1.2 were obtained. This coat, too, showed no detachment and very good adhesion after considerable stretching in the longitudinal direction.

Another exemplary embodiment which varies the fourth exemplary embodiment described above may include adding an alcoholic polyamide solution to the finally prepared Sipiol® curing agent mixture or the curing agent-free Sipiol® system. The mixing ratio of Sipiol® curing agent mixture or Sipiol® system to polyamide was varied from 1:1 to 1:5. Firmly adhering, resilient films which, generally, have coefficients of dry friction of less than 1.2 may also be obtained as a coat on elastomer profiles in this manner. Here too, N-methoxymethylated polyamides which are chemically crosslinkable using suitable catalysts, such as organic acids, may be used.

A last exemplary embodiment includes first applying one of the Sipiol® base systems without an additive, i.e. without additional polyamide powder or of a polyethylene powder or a solution of polyamide, to an elastomer profile in the form of a coating and only thereafter applying a fine polyamide powder or a fine polyethylene powder, for example, a fine polyethylene powder having an ultrahigh molecular weight, to the still wet coat. For this purpose, the powder may be, for example, sprinkled or blown onto the still wet coat and the coat with the powder incorporated by sprinkling on or blowing on may then be dried for 15 minutes at 120° C. Subsequent measurements of the coefficients of dry friction of coated windshield wiper blades produced in this manner gave coefficients of dry friction of from 0.6 to 0.9.

Regarding the methods for applying the coatings described to the elastomer profiles and the method for their preparation or their thermal after treatment, in general, the elastomer profiles may be produced with the aid of an extruder, the coatings according to the exemplary embodiments described being applied thereon, for example, immediately after the extrusion, by spraying, dipping or brushing. After the application of the coating, a conventional vulcanization process of the elastomer profile may then be carried out, for example, in a salt bath or in an oven, before the coated and vulcanized elastomer profile is finally cut.

The application of the coating to the elastomer profile may also be effected only after vulcanization, which may require a further thermal treatment at, for example, a lower temperature than in the case of the preceding vulcanization. This thermal treatment may then be effected, for example, downstream of the salt bath or downstream of the oven in a further hot zone.

The thermal treatment during the vulcanization or in the downstream hot zone effects chemical crosslinking within the coating and also bonding or crosslinking of the coating with the elastomer profile present underneath.

What is claimed is:

1. A lubricant varnish, comprising:
    a polyurethane;
    a siloxane; and
    at least one of a polyamide powder, a polyethylene powder, and a solution of a polyamide;
    wherein the solution of the polyamide is an alcoholic solution of one of an N-methoxymethylated polyamide and copolyamide.

2. A lubricant varnish, comprising:
    a polyurethane;
    a siloxane; and
    at least one of a polyamide powder, a polyehtylene powder, and a solution of a polyamide;
    wherein the lubricant varnish is in a form of one of an aqueous solution and a dispersion.

3. The lubricant varnish according to claim 2, wherein the lubricant varnish is applied to an elastomer.

4. The lubricant varnish according to claim 2, wherein the polyamide powder and the polyethylene powder each have a particle size of less than 10 µm.

5. The lubricant varnish according to claim 2, wherein the solution of the polyamide is at least one of an alcoholic solution and an aqueous solution.

6. The lubricant varnish according to claim 2, further comprising:
    a curing agent.

7. The lubricant varnish according to claim 2, further comprising;
    a catalyst configured to catalyze a final curing of the solution of the polyamide in the lubricant varnish.

8. The lubricant varnish according to claim 2, wherein solids proportion of at least one of the polyamide and the polyethylene in the lubricant varnish is from 0.5% by weight to 90% by weight.

9. A lubricant varnish, comprising:

a polyurethane;

a siloxane;

at least one of a polyamide powder, a polyethylene powder, and a solution of a polyamide; and a curing agent;

wherein the curing agent is an isocyanate-based curing agent.

10. A method for coating an elastomer, comprising:

applying a first coat of a lubricant varnish to the elastomer, the first coat having at least a polyurethane and a siloxane; and applying a second coat, the second coat being one of an alcoholic solution of a polyamide, an aqueous solution of a polyamide, a polyamide powder, and a polyethylene powder.

11. The method according to claim 10, wherein the elastomer is a windshield wiper blade.

12. The method according to claim 10, wherein at least one of the polyamide powder and the polyethylene powder is at least one of sprinkled and blown onto the first coat.

13. The method according to claim 10, further comprising:

drying the first coat before application of the second coat.

14. The method according to claim 10, wherein the second coat is applied to the first coat while the first coat is wet.

15. The method according to claim 10, further comprising:

after application of the second coat, subjecting the coated elastomer to a drying thermal treatment.

16. The method according to claim 10, further comprising:

after application of the second coat, subjecting the coated elastomer to a thermal treatment that thermally crosslinks at least the first coat.

17. The method according to claim 10, wherein at least one of the first coat and the second coat is applied by at least one of spraying, dipping and brushing.

18. The method according to claim 10, wherein the first coat is applied to the elastomer immediately after an extrusion of the elastomer, and wherein the elastomer applied with the first coat and the second coat is vulcanized.

19. The method according to claim 10, wherein the first coat is applied to the elastomer profile immediately after an extrusion of the elastomer profile, and wherein the elastomer is vulcanized before applying the first coat and the second coat.

* * * * *